Oct. 5, 1965     J. MERCIER     3,209,785
PRESSURE VESSELS
Original Filed April 30, 1959
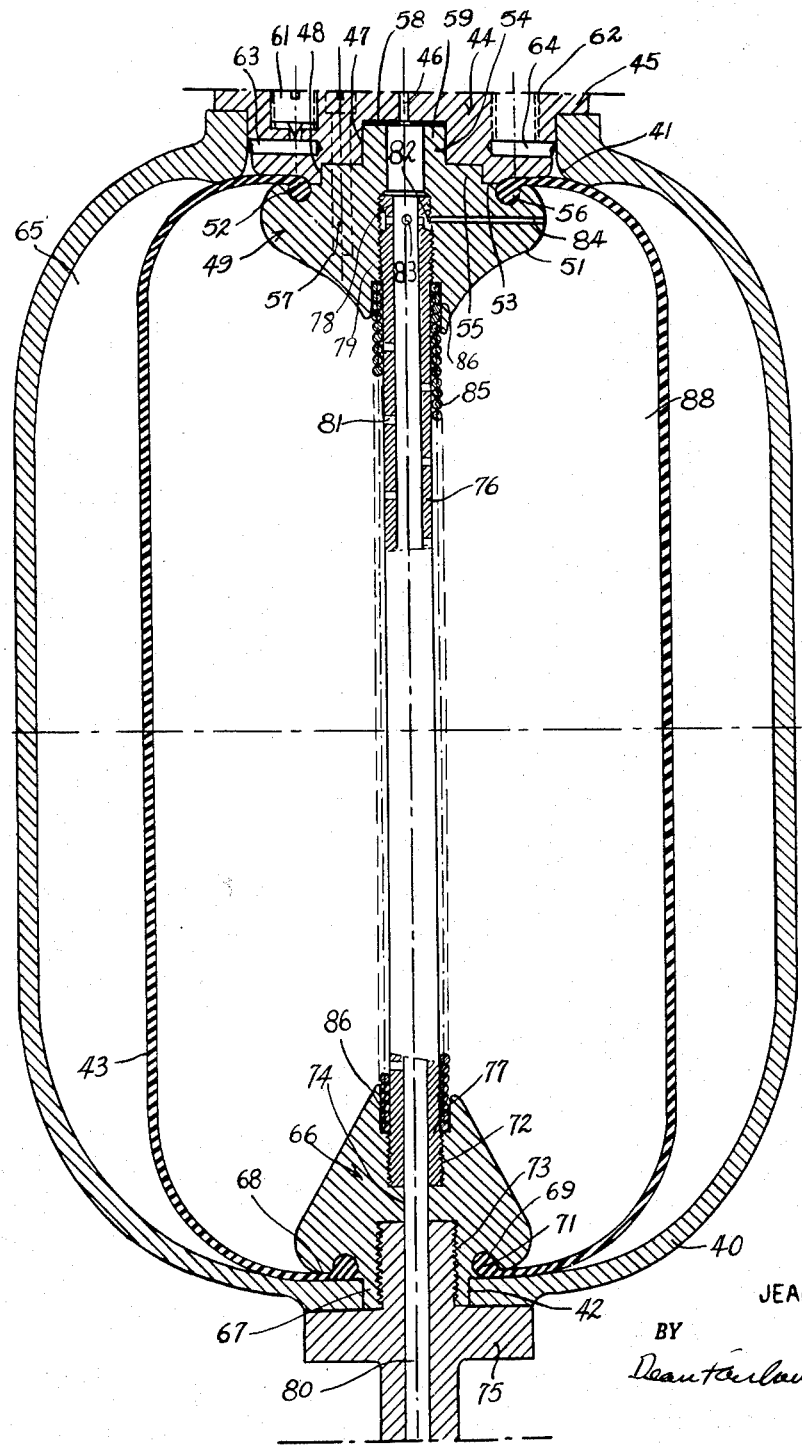
INVENTOR.
JEAN MERCIER
BY
Dean Fairall & Hirsch
ATTORNEYS 3,209,785
PRESSURE VESSELS
Jean Mercier, 1185 Park Ave., New York, N.Y.
Application May 8, 1963, Ser. No. 278,850, now Patent No. 3,161,208, dated Dec. 15, 1964, which is a division of application Ser. No. 810,165, Apr. 30, 1959, now Patent No. 3,095,013, dated Jan. 25, 1963. Divided and this application May 19, 1964, Ser. No. 368,659
Claims priority, application France, July 30, 1958, 771,445
3 Claims. (Cl. 138—30)

This application is a division of copending application Serial No. 278,850, filed May 8, 1963, now Patent No. 3,161,208 which in turn is a division of application Serial No. 810,165, filed April 30, 1959, and now Patent No. 3,095,013.

This invention relates to the art of pressure vessels, more particularly of the type having a deformable partition therein.

As conducive to an understanding of the invention, it is noted that where such pressure vessels are of a large size and the partition is an elongated bladder or sleeve, between the two fluids under pressure contained therein, which is compressed during operation, it is likely to rub against the side wall of the vessel with possibility of rupture of the bladder or sleeve and failure of the pressure vessel. In addition when such elongated bladder or sleeve is compressed, it may form a sharp fold which is also likely to cause rupture.

It is accordingly among the objects of the invention to provide a pressure vessel of the above type in which the deformable partition therein is precluded from rubbing against the side wall of the container and is not likely to form sharp folds, thereby preventing rupture of said bladder with resultant failure of the unit.

According to the invention these objects are accomplished by the arrangement and combination of elements hereinafter described and particularly recited in the claims.

In the accompanying drawings in which is shown one of various possible embodiments of the several features of the invention, The single figure is a longitudinal sectional view of one embodiment of the invention.

In the embodiment shown in the drawing, the pressure vessel comprises a rigid container 40 illustratively cylindro-spherical having axially aligned openings 41, 42 at its respective ends.

Positioned in the container and extending the length thereof is a flexible partition or sleeve 43 of resilient material.

Means are provided securely to retain the respective ends of the sleeve in fixed position. To this end, a disc 44 is positioned in opening 41, said disc having an annular flange 45 adapted to seat on the outturned rim of said opening and being secured thereto in any suitable manner such as by screws (not shown).

The disc 44 has an axial bore therethrough having successive portions 46, 47 and 48 of increasing diameter. Mounted on the disc 44 is a support 49 which is substantially conical in contour having a rounded periphery 51 and having an annular groove 52 in its top surface 53 adjacent said rounded periphery.

Rising from the top surface of the support is a stem which has successive portions 54 and 55 of increasing diameter adapted to fit into the portions 47 and 48 of the disc as is shown in the drawing.

Thus when the thickened rim 56 at one end of the sleeve 43 is positioned in the annular groove 52 and screws 57 are tightened, the rim 56 will be securely clamped between the undersurface of the disc 44 and the top surface 53 of the support, a gasket 58 between the outer end 59 of the stem and the disc providing a seal.

As is clearly shown in the figure, the disc 44 has ports 61 and 62 leading into transverse bores 63, 64 in the disc, said bores being in communication with the chamber 65 of the container between the sleeve 43 and the wall thereof.

To hold the other end of the sleeve 43 in position, a second conical support 66 is provided which has an axial stem 67 extending through the opening 42 of the container. The surface 68 of the support 66 at the root end of stem 67 has an annular groove 69 in which is positioned the thickened rim 71 at the other end of the sleeve 43.

The support 66 has internally threaded axial bores 72, 73 at each end with an intervening axial bore 74 of smaller diameter in communication therewith.

Thus, when a hollow fitting 75 having a bore 80 is screwed into the bore 73 it will securely clamp the rim 71 between the support 66 and the wall of the container.

Extending axially of the container is a tube or core 76 the ends 77, 78 of which are screwed into the axial bore 72 of support 66 and into the axial bore 79 of support 49.

The tube has a plurality of openings 81 along the length thereof and has an annular groove 82 at its upper end with openings 83 in the floor of the groove leading into the tube 76. In addition, a transverse bore 84 through the support 49 leads into the annular groove 82.

Encompassing the tube 76 is a tightly wound coil spring 85, the ends of which are seated in enlarged portions 86 at the inner ends of bores 72 and 79.

In the operation of the pressure vessel shown in the drawing, as a pressure transmitter for example, with the ports 46 and 61 open, to vent air from the vessel, a liquid such as oil is forced into the chamber 88 between the spring 85 and sleeve 43, through bore 80, tube 76, openings 81 and between the convolutions of coil spring 85. As a result, the sleeve 43 will expand until it is completely filled with liquid. Thereupon the ports 46 and 61 are closed and a gas under pressure is introduced through port 62, which is now opened for this purpose, into the chamber 65. As a result, the sleeve 43 will be compressed and the liquid in the chamber 88 will be forced under pressure through the convolutions of spring 85, openings 81, tube 76 and bore 80 to the exterior.

With the construction above described by reason of the tube 76, no sharp folds will be caused in the sleeve 43.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a rigid container having a deformable partition therein defining two chambers for fluid, each having a fluid passageway leading thereinto, a flexible closely wound coil spring defining a guide member for said partition in one of said chambers, said guide member extending axially of said container and secured with respect thereto at both ends, said closely wound coil spring having adjacent convolutions substantially in engagement and being encompassed by said partition, said partition comprising an elongated sleeve secured at both ends with respect to said container, said coil spring having a substantially continuous surface with respect to said partition to restrain extrusion therethrough of said partition, said surface permitting passage therethrough of the fluid flowing through one of said fluid passageways.

2. The combination set forth in claim 1 in which means are provided to drain one of the chambers defined by said partition.

3. A pressure vessel comprising a rigid container having a deformable partition therein defining two chambers for fluid, each having a fluid passageway leading thereinto, said partition comprising an elongated sleeve, a pair of clamping supports to retain the ends of said sleeve in fixed position with respect to the ends of said container, said supports being axially aligned, a guide member in said sleeve extending axially between said supports and mounted thereon, said guide member comprising a rigid tube having a plurality of lateral openings therethrough leading into the bore thereof and a closely wound coil spring encompassing said tube, said coil spring having adjacent convolutions substantially in engagement and having a substantially continuous surface with respect to said sleeve to restrain extrusion therethrough of said sleeve, said surface permitting passage therethrough of the fluid flowing through one of said fluid passageways, one of said fluid passageways leading into said tube and the other into the container between the wall thereof and the sleeve.

References Cited by the Examiner
UNITED STATES PATENTS

| | | | |
|---|---|---|---|
| 2,278,688 | 4/42 | Caminez | 138—30 |
| 2,351,761 | 6/44 | Hanna | 138—30 |
| 2,845,951 | 8/58 | Hugley et al. | 138—30 |
| 2,847,035 | 8/58 | Peters | 138—30 |

LEWIS J. LENNY, *Primary Examiner.*

EDWARD V. BENHAM, *Examiner.*